(12) United States Patent
Lee

(10) Patent No.: US 11,060,612 B2
(45) Date of Patent: Jul. 13, 2021

(54) SEALING MEMBER FOR GASKET, AND GASKET COMPRISING SAME

(71) Applicant: KUK IL INNTOT CO., LTD., Ulsan (KR)

(72) Inventor: Jong Chul Lee, Ulsan (KR)

(73) Assignee: KUK IL INNTOT CO., LTD., Ulsan (KR)

( * ) Notice: Subject to any disclaimer, the term of this patent is extended or adjusted under 35 U.S.C. 154(b) by 0 days.

(21) Appl. No.: 16/610,394

(22) PCT Filed: May 4, 2018

(86) PCT No.: PCT/KR2018/005227
§ 371 (c)(1),
(2) Date: Nov. 1, 2019

(87) PCT Pub. No.: WO2018/203730
PCT Pub. Date: Nov. 8, 2018

(65) Prior Publication Data
US 2021/0003218 A1   Jan. 7, 2021

(30) Foreign Application Priority Data

May 5, 2017 (KR) ........................ 10-2017-0057106
Jun. 26, 2017 (KR) ........................ 10-2017-0080262
Oct. 30, 2017 (KR) ........................ 10-2017-0142753
Oct. 30, 2017 (KR) ........................ 10-2017-0142766

(51) Int. Cl.
*F16J 15/12* (2006.01)
*F16L 23/18* (2006.01)
*F16J 15/06* (2006.01)
*F16L 25/02* (2006.01)
*F16J 15/10* (2006.01)

(52) U.S. Cl.
CPC ........... *F16J 15/122* (2013.01); *F16J 15/064* (2013.01); *F16J 15/104* (2013.01); *F16L 23/18* (2013.01); *F16L 25/026* (2013.01); *Y10S 277/919* (2013.01); *Y10S 285/91* (2013.01)

(58) Field of Classification Search
CPC ....... F16L 23/18; F16L 25/026; Y10S 285/91; Y10S 277/919; F16J 15/064; F16J 15/104; F16J 15/122
See application file for complete search history.

(56) References Cited

U.S. PATENT DOCUMENTS

| | | | | |
|---|---|---|---|---|
| 4,776,600 A * | 10/1988 | Kohn | ..................... | F16L 25/026 277/611 |
| 5,316,320 A * | 5/1994 | Breaker | ................... | F16L 23/16 277/611 |
| 5,564,715 A * | 10/1996 | Wallace | ................. | F16J 15/127 277/612 |
| 5,938,246 A * | 8/1999 | Wallace | ................. | F16L 23/18 277/314 |

(Continued)

FOREIGN PATENT DOCUMENTS

| | | |
|---|---|---|
| JP | 2005-090722 A | 4/2005 |
| KR | 10-2013-0067176 A | 6/2013 |

(Continued)

*Primary Examiner* — Nicholas L Foster
(74) *Attorney, Agent, or Firm* — Novick, Kim & Lee, PLLC; Jae Yoon Kim

(57) ABSTRACT

A gasket is disposed between pipe flanges to prevent leakage.

9 Claims, 30 Drawing Sheets

(56) References Cited

U.S. PATENT DOCUMENTS

| | | | | |
|---|---|---|---|---|
| 7,976,074 B2* | 7/2011 | Anderson | ............... | F16L 23/18 |
| | | | | 285/368 |
| 8,678,398 B2* | 3/2014 | Anderson | ............. | F16L 25/026 |
| | | | | 277/608 |
| 9,976,680 B2* | 5/2018 | Kramer | .................... | F16L 25/02 |
| 10,107,400 B2* | 10/2018 | Lee | ........................ | F16L 23/20 |
| 2009/0243290 A1* | 10/2009 | Anderson | ............... | F16L 23/18 |
| | | | | 285/343 |
| 2011/0266755 A1* | 11/2011 | Anderson | ............. | F16L 25/026 |
| | | | | 277/611 |
| 2016/0138718 A1* | 5/2016 | Lee | ........................ | F16J 15/104 |
| | | | | 277/608 |
| 2019/0234516 A1* | 8/2019 | Lee | ........................ | F16L 23/18 |

FOREIGN PATENT DOCUMENTS

| | | | |
|---|---|---|---|
| KR | 10-2014-0013187 | A | 2/2014 |
| KR | 10-1506189 | B1 | 3/2015 |
| KR | 10-1598802 | B1 | 3/2016 |
| KR | 10-2016-0059387 | A | 5/2016 |
| KR | 10-2016-0059388 | A | 5/2016 |
| KR | 10-2016-0110896 | A | 9/2016 |
| WO | 2003-100301 | A1 | 12/2003 |

* cited by examiner

SEALING MEMBER FOR GASKET, AND GASKET COMPRISING SAME

BACKGROUND

1. Field of the Invention

The present disclosure relates to a sealing device equipped in a gasket provided between pipe flanges to prevent leakage, and a gasket including the same.

2. Discussion of Related Art

A gasket is a generic term for static seals fastened with joined surfaces of pressure containers, pipe flanges, or machine tools using a bolt or the like to prevent leakage. Various shapes or materials of gaskets may be used according to conditions, e.g., type, pressure, temperature, etc., of a working fluid to be used. In contrast, dynamic seals relatively used for moving parts are generically referred to as packing.

A term for the same type of seal may vary according to a place in which the seal is used. For example, an O-ring is referred to as an O-ring gasket when applied to a component to be fixed but is referred to as O-ring packing when applied to a movable component. Such terms are standardized but are not strictly observed.

FIG. 1 is a diagram illustrating an example in which a general gasket is used. A gasket 100 is installed between joined surfaces of pipe flanges 200. The installed gasket 100 prevents a fluid flowing inside a pipe conduit from leaking to the outside. After the gasket 100 is installed between the pipe flanges 200, a bolt 400 is inserted into openings of the pipe flanges 200 and an opposite side of the bolt 400 is tightened with a nut 300 to prevent separation of the joined surfaces of the pipe flange 200. Before the bolt 400 is tightened with the nut 300, a metal washer 610 and an insulating washer 620 may be combined with the bolt 400. The bolt 400 may be inserted into the openings of the pipe flange 200 by being inserted into an insulating sleeve 500.

Patent document 1 (Korean Laid-Open Patent Publication No. 10-2016-0059388, published on May 6, 2016) discloses a gasket with a sealing member for doubly preventing leakage even in a vacuum and high-pressure environment.

FIGS. 2 and 3 are a perspective view and a cross-sectional view of a second embodiment disclosed in Patent document 1 described above.

The gasket disclosed in Patent document 1 includes a metallic central layer 100, and a first layer 210 and a second layer 220 formed of an insulating material and respectively provided on an upper surface and a lower surface of the central layer 100 in the same shape as the central layer 100. Furthermore, in Patent document 1, a first groove and a second groove are formed extending to the central layer 100 while passing through the first layer 210 and the second layer 220. A third groove and a fourth grove are formed in the first layer 210 and the second layer 220 to be more distant from a center of the gasket than the first layer 210 and the second layer 220.

A first sealing member 410 and a second sealing member 420 each having a trapezoidal shape are respectively provided in the first layer 210 and the second layer 220 to open toward the center of the gasket so as to prevent leakage. A first spring 510 and a second spring 520 are respectively inserted into an opening of the first sealing member 410 and an opening of the second sealing member 420. In addition, a third sealing member 610 and a fourth sealing member 620 which are metallic O-ring members are respectively inserted into the third groove and the fourth groove for double leakage prevention.

However, in Patent document 1, the sealing members, and particularly, the third and fourth sealing members 610 and 620 are O-ring members simply inserted into the third and fourth grooves and do not have changeability to self-adjust a degree of sealing according to a type of a leaking fluid. Thus, there is a problem that a sealing effect is not high. Furthermore, Patent document 1 does not provide embodiments or structures applicable to a high-temperature environment in which an insulating material melts and thus sealing cannot be achieved in the high-temperature environment.

SUMMARY OF THE INVENTION

The present disclosure is directed to a gasket with sealing devices having a new structure for more effectively preventing leakage at joined parts of flanges even in a vacuum and high-temperature environment.

The present disclosure is also directed to a structure which employs metallic sealing devices but is capable of electrically insulating between flanges.

The present disclosure is also directed to reducing deterioration of the durability of a product due to abrasion between a gasket and flanges while improving the durability of the gasket in a high-temperature environment.

To this end, according to an aspect of the present disclosure, a sealing device is in the form of a stripe and includes a C-ring portion, which opens in an inner direction, at an inner end thereof, wherein the C-ring portion is formed of a resilient material that can be stretched out or contracted.

According to another aspect of the present disclosure, an insulating gasket includes a central layer, and a first layer and a second layer respectively provided on an upper surface and a lower surface of the central layer. The sealing device described above is provided in each of a first groove of the first layer and a second groove of the second layer.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
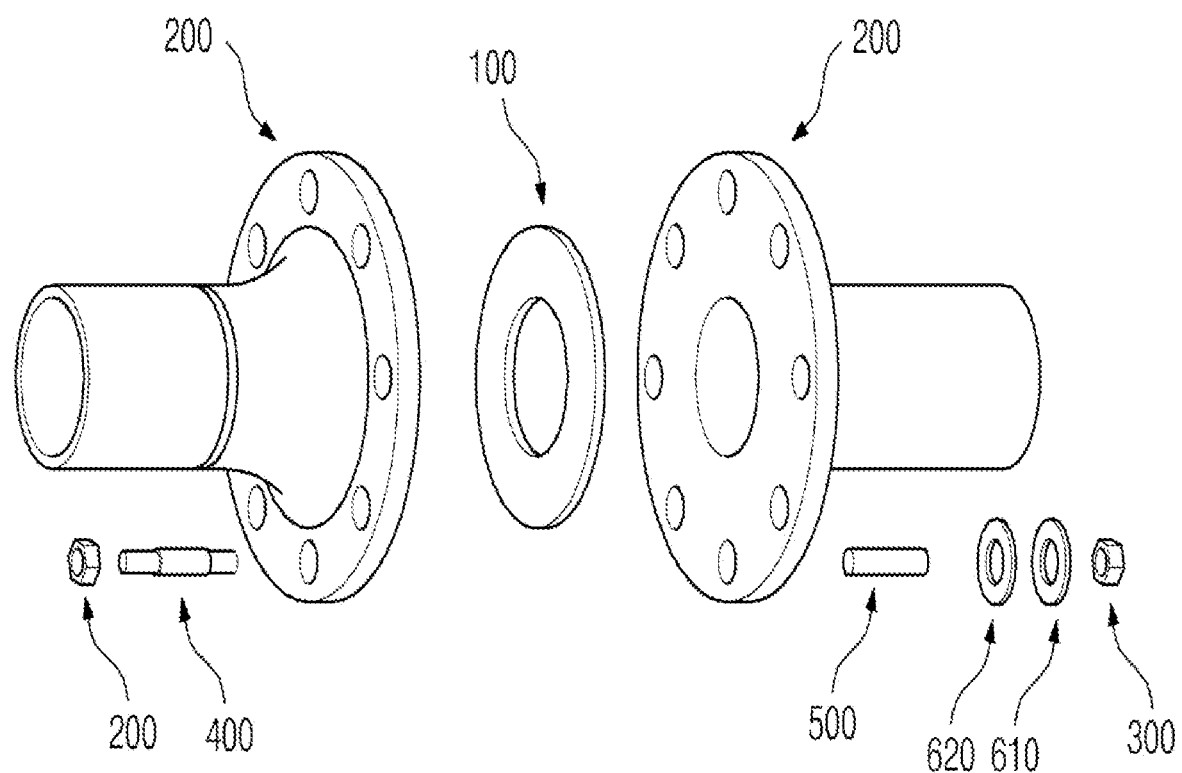
FIG. 1 is a diagram illustrating an example in which a general gasket is used.
Figure 2:
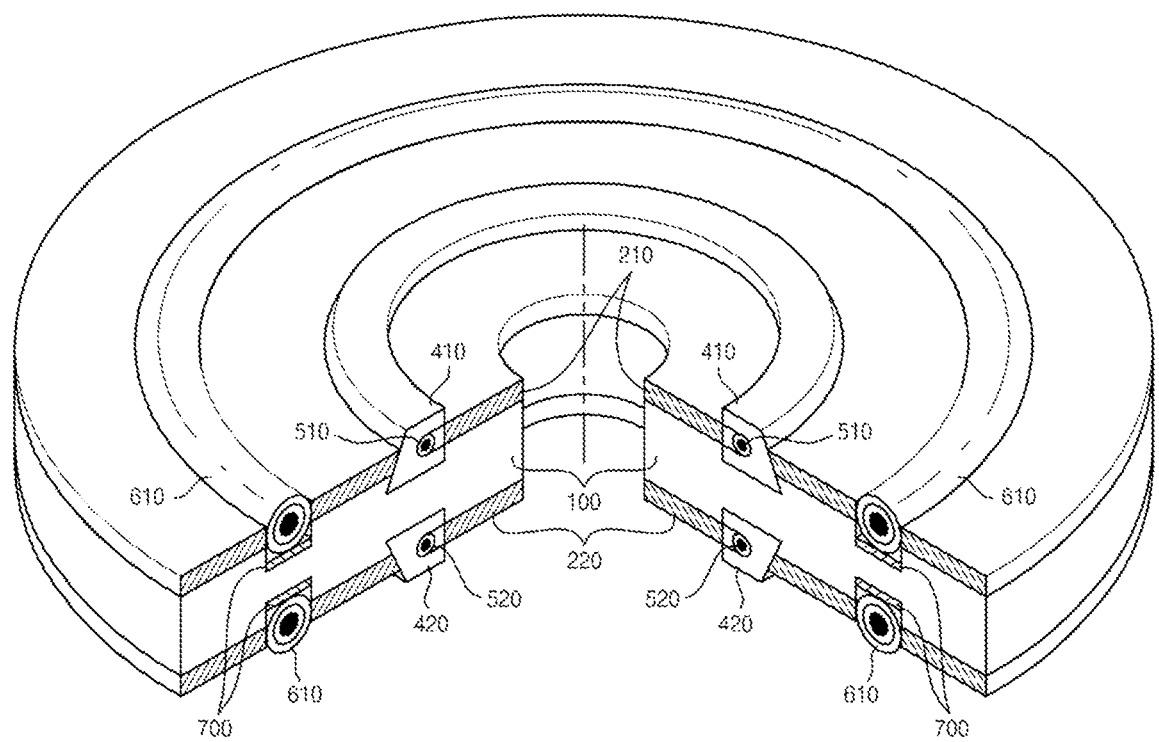
FIGS. 2 and 3 are a perspective view and a cross-sectional view of the gasket disclosed in Patent document 1 above.
Figure 3:
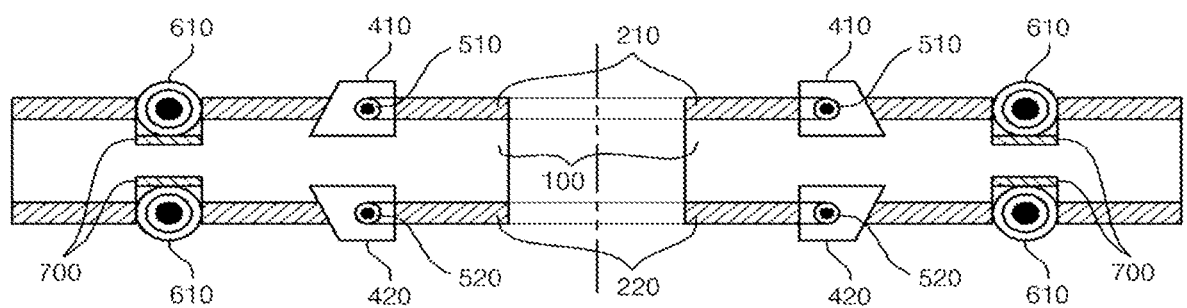

The present disclosure will be described with respect to one cross section of a disc type gasket, for convenience of explanation of a structure of the disc type gasket and for consistency with the drawings. Although the one cross section of the disc type gasket is described herein, it will be apparent to those of ordinary skill in the art from the drawings and the following description that each component of the disc type gasket of which a center portion is open is in the form of a stripe, and a shape and features of the whole disc type gasket will be understood from a description regarding a cross section of each component. To avoid redundancy, features of the present disclosure except parts thereof that are the same as those of the related art will be described.

As used herein, the term "inner" should be understood to mean a direction toward a central axis of a component which is in the form of a stripe, and the term "outer" should be understood to mean a direction away from the central axis. The term "upper" should be understood to mean an upward direction in the drawings and the term "lower" should be understood to mean a downward direction in the drawings.

A gasket according to a first embodiment of the present disclosure will be described with reference to FIGS. 4 and 5, and first and second sealing devices 41 and 42 equipped in the gasket according to the first embodiment will be described with reference to FIG. 6.

Figure 4:
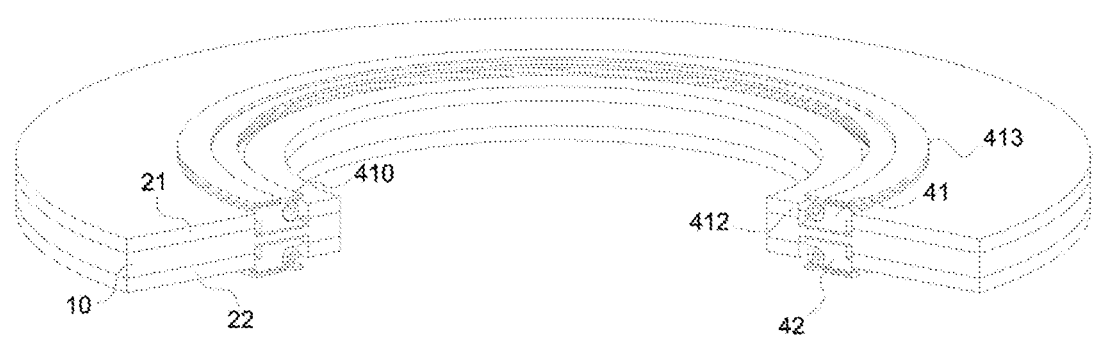
FIGS. 4 and 5 are a perspective view and a cross-sectional view of a gasket with a first sealing device and a second sealing device, according to a first embodiment of the present disclosure.
Figure 5:
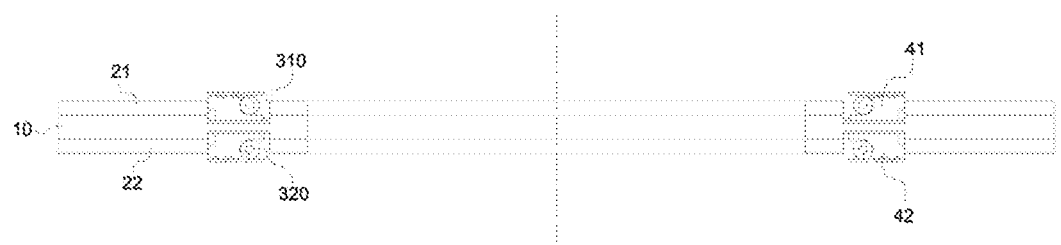

FIG. 4 is a perspective view of the gasket according to the first embodiment of the present disclosure. FIG. 5 is a cross-sectional view of the gasket of FIG. 4. The gasket according to the first embodiment of the present disclosure includes a disc type central layer 10 with an open center, and a first layer 21 and a second layer 22 having the same shape as the central layer 10 and respectively provided on an upper surface and a lower surface of the central layer 10. As illustrated in FIG. 5, a first groove 310 and a second groove 320 are respectively provided in the first layer 21 and the second layer 22 to extend to a portion of the central layer 10 while passing through the first layer 21 and the second layer 22. However, the first and second grooves 310 and 320 do not pass through the central layer 10. In the first embodiment, the central layer 10 is formed of a metal material, and the first layer 21 and the second layer 22 are formed of electrically insulating materials. In the case of a high-temperature gasket which will be described below, the central layer 10 may be formed of an electrically insulating material and the first layer 21 and the second layer 22 may be formed of metal materials.

A first sealing device 41 and a second sealing device 42 are respectively provided in the first groove 310 and second groove 320 to block a fluid leaking from flanges from flowing to the outside. The first sealing device 41 and second sealing device 42 may be preferably formed of metal materials but are not limited thereto. Since the first sealing device 41 and the second sealing device 42 have the same shape and are symmetrical to each other in a vertical direction, the first embodiment will be hereinafter described with respect to the first sealing device 41 for convenience of explanation.

A structure and functions of the first sealing device 41 according to the first embodiment will be described in detail with reference to FIG. 6 below. FIG. 6 is an enlarged view of a right portion of a cross section of the first sealing device 41 illustrated in FIG. 5. In FIG. 6, a left side of the first sealing device 41 should be understood as facing an inner direction I toward the central axis and a right side thereof should be understood as facing an outer direction O.

Figure 6:
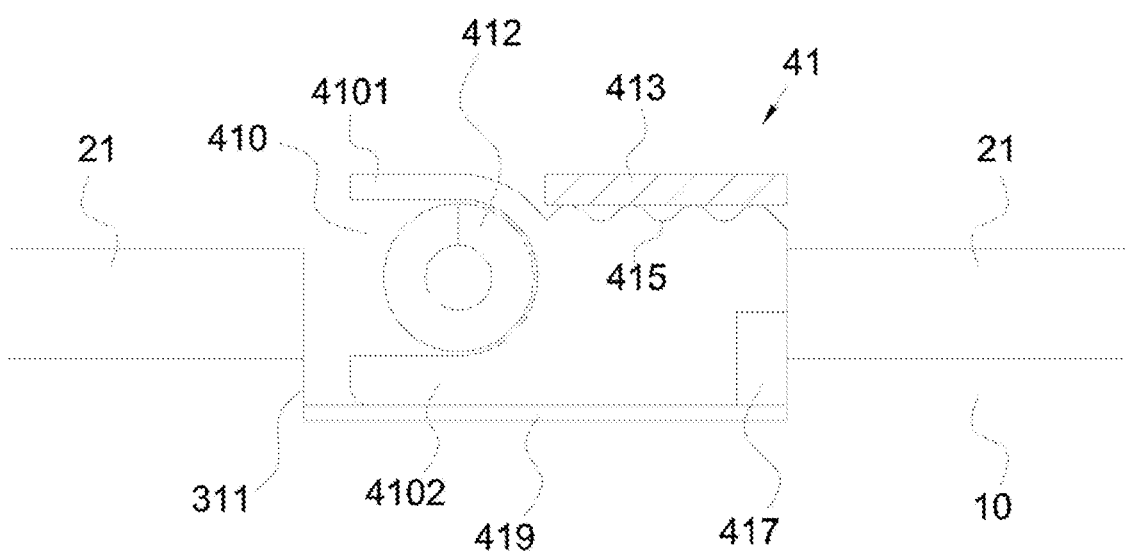
FIG. 6 is a diagram illustrating the first sealing device according to the first embodiment of the present disclosure.

The first sealing device 41 according to the first embodiment of the present disclosure includes a C-ring portion 410 having a C-shaped cross section at an inner end thereof (a left end in FIG. 6. A direction in which the C-ring portion 410 is open may be a direction toward a center of the gasket, i.e., the inner direction I (a left direction in FIG. 5.

The C-ring portion 410 may be stretched out or contracted. More specifically, an upper end 4101 of the C-ring portion 410 may be moved in an upward direction. When a fluid leaks and flows into an opening of the C-ring portion 410, the C-ring portion 410 may be stretched out and thus a degree of sealing between the C-ring portion 410 and a flange above the C-ring portion 410 may be increased. Thus, the degree of sealing may be increased by a force applied when the fluid leaks.

Preferably, in the first embodiment, the C-ring portion 410, and particularly, the upper end 4101 of the C-ring portion 410, may be formed of a resilient material. More preferably, only the upper end 4101 of the C-ring portion 410 may be formed of a resilient material, and a lower end 4102 thereof may be fixed to not move even when a fluid flows into the C-ring portion 410, so that the C-ring portion 410 may be restored to the original state to continuously achieve a sealing effect even when the C-ring portion 410, and particularly, an upper end of the C-ring portion 410 is stretched out or contracted (or is moved upward or downward) by an internal or external force applied thereto. Particularly, the sealing effect may be continuously achieved due to the above-described characteristics of the C-ring portion 410 even in an environment in which vibration is continuously applied.

More preferably, in the first embodiment, a spring portion 412 which is in the form of stripe may be inserted into an open space of the C-ring portion 410 of the first sealing device 41. A size of the spring portion 412 may be determined such that the inside of the C-ring portion 410 is filled with the spring portion 412, i.e., a curved inner surface of the C-ring portion 410 is in contact with the spring portion 412. The spring portion 412 is provided in the C-ring portion 410 to reinforce a restoring property of the C-ring portion 410 so as to maintain the shape of the C-ring portion 410. The shape of the C-ring portion 410 may be supported due to elasticity of the spring portion 412 so that shape of the C-ring portion 410 may be maintained to achieve the sealing effect even when an external force sufficient to change the C-ring portion 410 is applied. However, the spring portion 412 may not be inserted, provided that the C-ring portion 410, and particularly, the upper end 4101 of the C-ring portion is formed of a resilient material.

Preferably, in the first embodiment, a first anti-abrasion layer 413 may be further provided on an outer upper surface of the first sealing device 41. Referring to a right upper part of FIG. 6, the first anti-abrasion layer 413 has a plate type cross section which is in a form of a stripe, and may be provided only on an upper surface of a side of the first sealing device 41 rather than an entire upper surface of the first sealing device 41. That is, the first anti-abrasion layer 413 may be provided on the upper surface of the C-ring portion 410 except an inner upper end thereof. The first anti-abrasion layer 413 is provided to not only decrease an abrasion between the first sealing device 41 and the flange in a high-temperature environment but also additionally block a fluid leaking from the C-ring portion 410. The first anti-abrasion layer 413 may be formed of a material to be sustainable even in high temperatures More preferably, in the first embodiment, an outer upper surface of the first sealing device 41 may be in a corrugated form 415 of which an upper end is rounded. The corrugated form 415 improves a degree of sealing between the first sealing device 41 and the first anti-abrasion layer 413 and prevents damage to the first anti-abrasion layer 413. The sealing effect when the corrugated form 415 and the first anti-abrasion layer 413 are in contact with each other may be greater than that when the first anti-abrasion layer 413 and the outer upper surface of the first sealing device 41 are in surface-contact with each other, and the corrugated form 415 having the rounded upper end may decrease damage to the first anti-abrasion layer 413.

Figure 7:
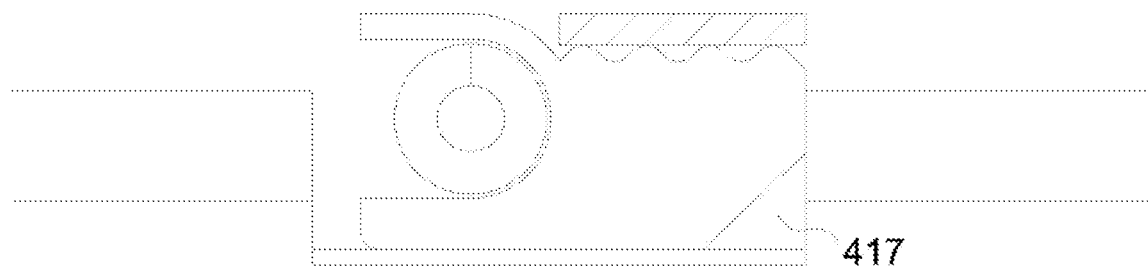
FIG. 7 is a diagram illustrating a modified example of the first sealing device according to the first embodiment of the present disclosure.

In the first embodiment of the present disclosure, a first inwardly cut portion 417 which is cut in the inner direction I may be provided at an outer lower end of the first sealing device 41. The first inwardly cut portion 417 prevents the outer lower end of the first sealing device 41 from coming into physical contact with the central layer 10. In the first embodiment, galvanic corrosion may occur when the first sealing device 41 and the central layer 10 come into physical contact with each other, since the first groove 310 into which the first sealing device 41 is inserted extends to the central layer 10 and the first sealing device 41 and the central layer 10 are formed of the metal materials. Thus, when the first inwardly cut portion 417 is provided, the first sealing device 41 and the central layer 10 may be physically insulated from each other. The first inwardly cut portion 417 may have a cross section which is cut in a rectangular shape (see FIG. 6) or is cut tapering from bottom to top (see FIG. 7), but is not limited thereto and should be understood to include other various-shaped cross sections, provided that the outer lower end of the first sealing device 41 and the central layer 10 may be physically insulated from each other.

In a modified example of the first embodiment of the present disclosure, in order to physically insulate an inner lower end of the first sealing device 41 and the central layer 10 from each other, an inner sidewall 311 of the first groove 310 and an inner end of the first sealing device 41 may be spaced a certain distance from each other. In this case, a horizontal length of a cross section of the first sealing device 41 should be less than that of a cross section of the first groove 310. Since the inner end of the first sealing device 41 is spaced the certain distance from the inner sidewall 311 of the first groove 310, the flange may be effectively pressurized upward by the C-ring portion 410 due to pressure of a leaking fluid, thereby increasing a degree of sealing.

In an exemplary embodiment, similarly, a first outwardly cut portion which is symmetrical to the first inwardly cut portion 417 may be provided so that an inner lower end of the first sealing device 41 (particularly, a lower side of the C-ring portion 410 is also physically insulated from the central layer 10 formed of the metal material. In this case, the horizontal length of the cross section of the first sealing device 41 may be equal to that of the cross section of the first groove 310.

A first lower-surface insulating layer 419 is provided on a lower surface of the first sealing device 41 to electrically insulate between the first sealing device 41 and the central layer 10 which are formed of metal materials. A material of the first lower-surface insulating layer 419 may be, for example, an electrically insulating material.

Figure 8:
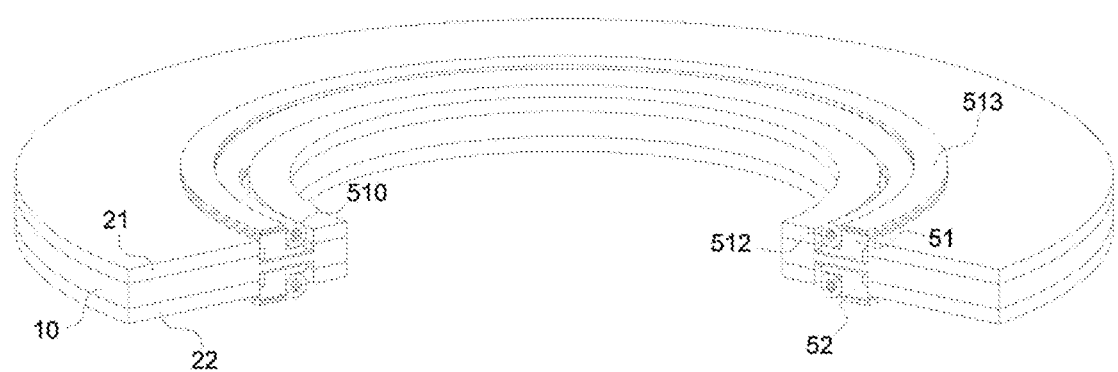
FIGS. 8 and 9 are a perspective view and a cross-sectional view of a gasket with a third sealing device and a fourth sealing device, according to a second embodiment of the present disclosure.
Figure 9:
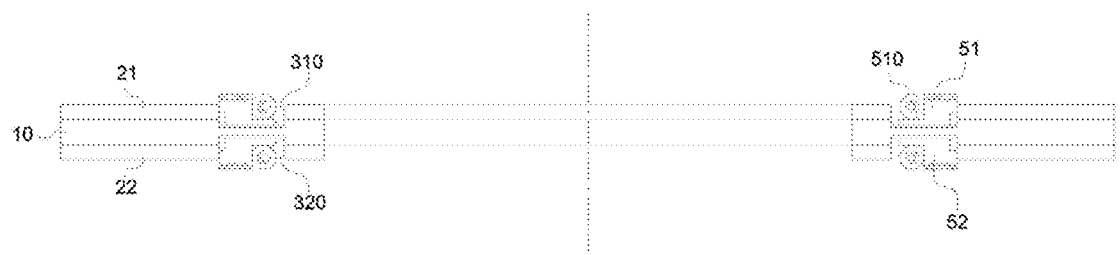
Figure 10:
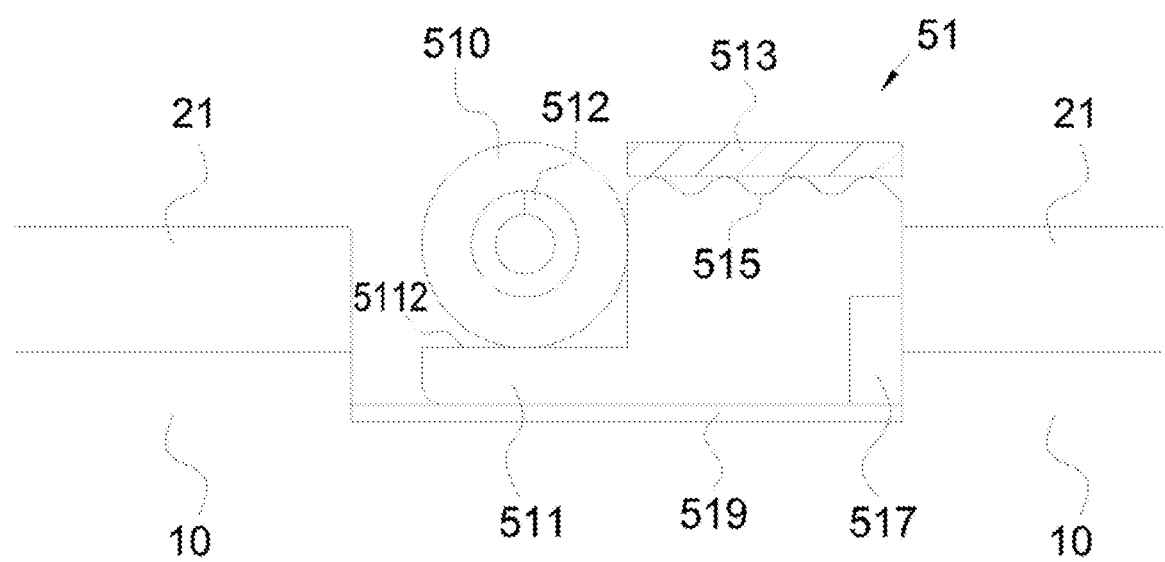
FIG. 10 is a diagram illustrating the third sealing device according to the second embodiment of the present disclosure.

FIGS. 8 and 9 are diagrams illustrating a gasket according to a second embodiment of the present disclosure. FIG. 10 is a diagram illustrating a third sealing device 51.

To avoid redundancy, the gasket according to a second embodiment will be described focusing on the differences from the first sealing device 41 according to the first embodiment, and a fourth sealing device 52 that is vertically symmetrical to the third sealing device 51 and a description thereof will be omitted here. Components of the second embodiment which are substantially the same as those of the first embodiment are assigned the same reference numerals, except that a corrugated form, a first anti-abrasion layer, a first inwardly cut portion, and a first lower-surface insulating layer are respectively assigned reference numerals 515, 513, 517, and 519.

As illustrated in FIG. 10, an O-ring 510 which is in the form of a stripe is provided on an inner side of the third sealing device 51 which is in the form of a stripe. The O-ring 510 may be a metal tubular O-ring configured to maintain the sealing effect even in a high-temperature environment. Since the O-ring 510 is provided on the inner side of the third sealing device 51, a fluid leaking from a center of the third sealing device 51 into the first groove 310 may be blocked to increase a degree of sealing between flanges in the vertical direction.

In an exemplary embodiment, a core spring portion 512 may be provided in the O-ring 510 to provide a force of restoration, so that the O-ring 510 may be restored to the original state even when the shape of the O-ring 510 is deformed by an external force. The third sealing device 51 may include an accommodation part 511 at an inner end thereof to accommodate and support the O-ring 510. The accommodation part 511 is configured to guide a position of the O-ring 510 and prevent the O-ring 510 from departing from a desired position when the O-ring 510 is installed.

The O-ring accommodation part 511 according to the present disclosure may be formed in various shapes. FIGS. 10 to 14 are diagrams illustrating examples of various shapes of an O-ring accommodation part.

According to an exemplary embodiment of the accommodation part 511 illustrated in FIG. 10, the accommodation part 511 may include a lower portion 5112 at an inner lower end thereof to upwardly support the O-ring 510. When the lower portion 5112 is provided, the inside of the whole third sealing device 51 has a "]" shape. Referring to FIG. 10, a first inwardly cut portion 517 is provided at an outer lower end of the third sealing device 51 to electrically insulate the third sealing device 51 from a central layer 10. To physically insulate between an inner lower end of the third sealing device 51 and the central layer 10, the inner sidewall 311 of the first groove 310 and an inner end of the third sealing device 51 may be spaced a certain distance from each other. In this case, a horizontal length of a cross section of the third sealing device 51 is less than that of a cross section of the first groove 310.

Figure 11:
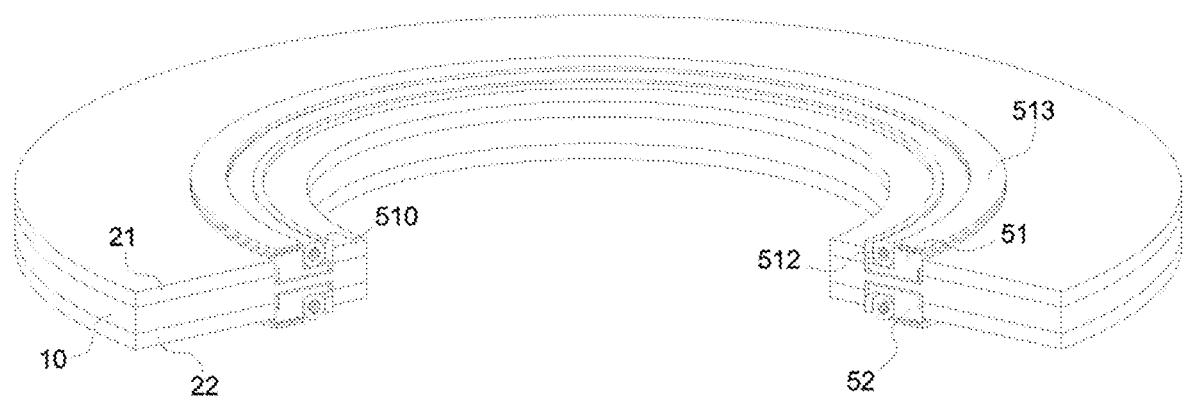
FIGS. 11 and 12 are a perspective view and a cross-sectional view of a modified example of the gasket according to the second embodiment of the present disclosure.
Figure 12:
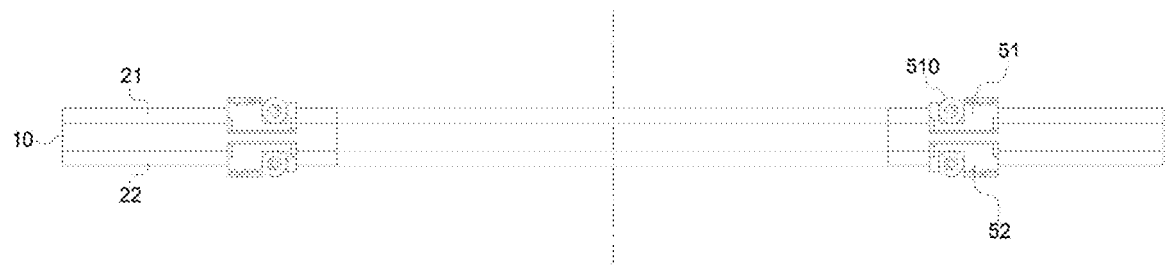
Figure 13:
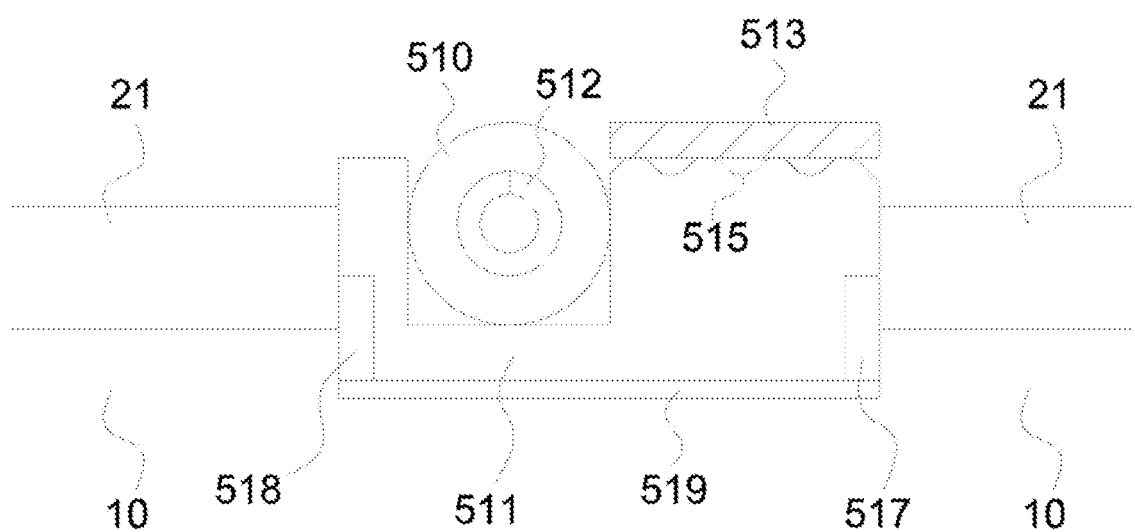
FIG. 13 is a diagram illustrating a third sealing device illustrated in FIGS. 11 and 12.

FIGS. 11 and 12 are a perspective view and a cross-sectional view of a modified example of the gasket according to the second embodiment of the present disclosure. FIG. 13 illustrates a third sealing device illustrated in FIGS. 11 and 12. An O-ring accommodation part of which a cross section has a "⌴" shape is provided in the third sealing device illustrated in FIG. 10, and an O-ring 510 is accommodated in the "⌴" shape.

Figure 14:
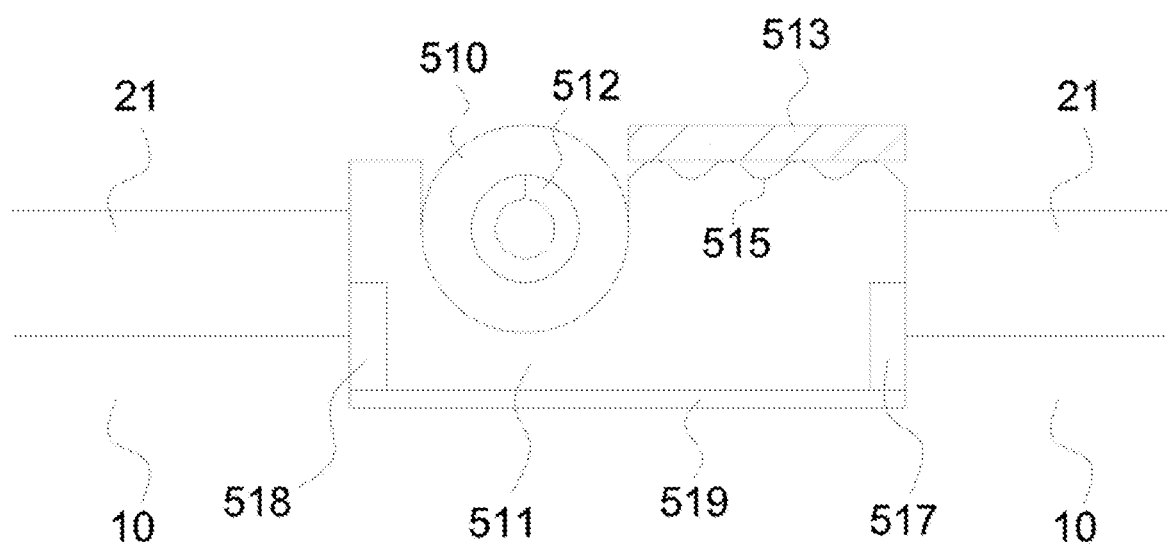
FIG. 14 is a diagram illustrating a modified example of the third sealing device according to the second embodiment of the present disclosure.

FIG. 14 is a diagram illustrating a modified example of the third sealing device according to the second embodiment of the present disclosure illustrated in FIG. 13. A cross section of an accommodation part 511 of the third sealing device of FIG. 14 may have a "U" shape.

When a cross section of an accommodation part has a "⌴" or "U" shape as described above, an O-ring may be easily accommodated therein, thereby increasing the convenience of installation.

In the embodiments of FIGS. 11 to 14, the horizontal length of the third sealing device 51 is equal to that of the first groove 310. In this case, a first outwardly cut portion 518 is formed at an inner lower end of the third sealing device 51 to physically separate the third sealing device 51 and a central layer 10 which are formed of metal materials as described with respect to the first embodiment.

Gaskets capable of maintaining the sealing effect even in a high-temperature environment according to a third embodiment and a fourth embodiment will be described with reference to FIGS. 15 to 22 below.

Figure 15:
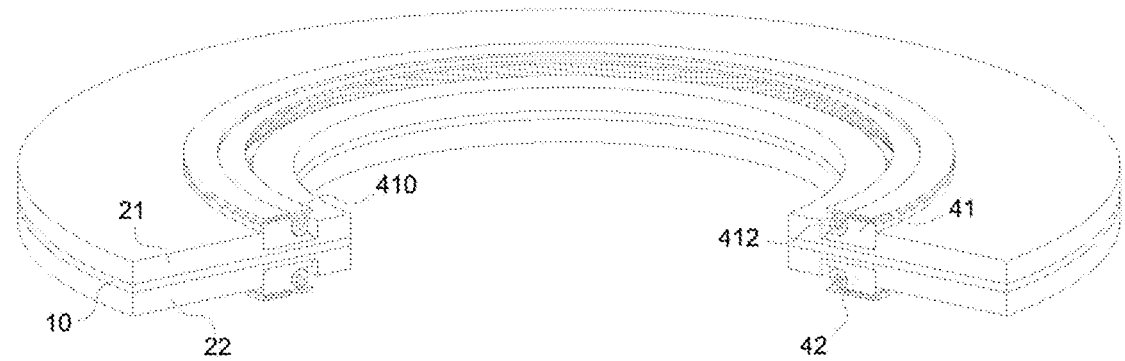
FIGS. 15 and 16 are a perspective view and a cross-sectional view of a gasket usable in a high-temperature environment, according to a third embodiment of the present disclosure.
Figure 16:
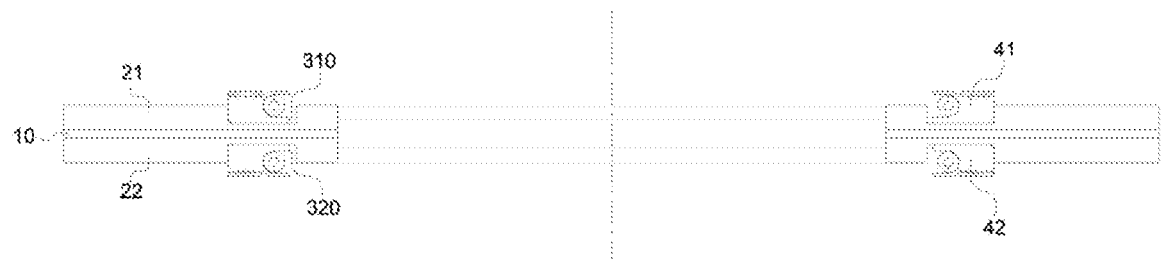
Figure 17:
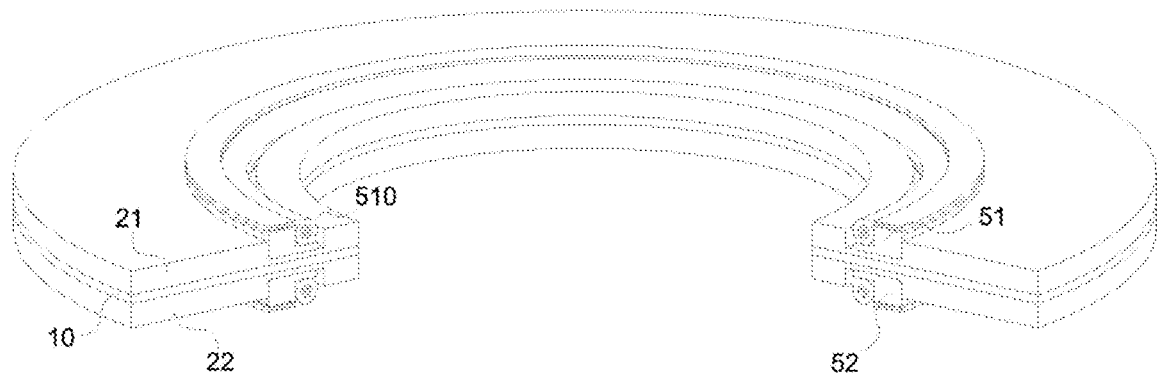
FIGS. 17 and 18 are a perspective view and a cross-sectional view of a gasket usable in a high-temperature environment, according to a fourth embodiment of the present disclosure.
Figure 18:
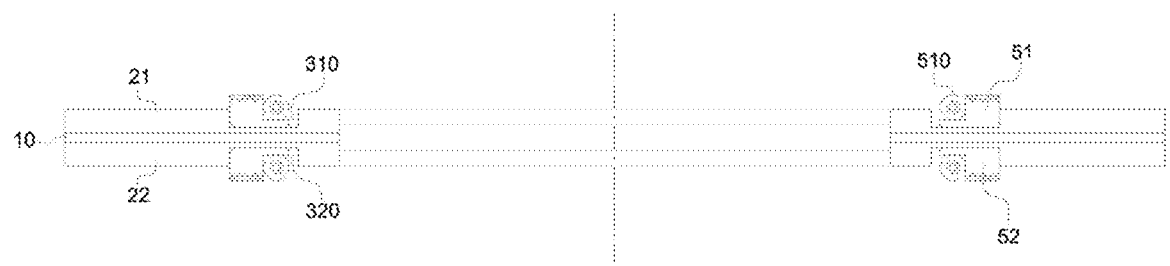

FIG. 15 is a perspective view of a gasket according to a third embodiment of the present disclosure. FIG. 16 is a cross-sectional view of the gasket of FIG. 16. FIG. 17 is a perspective view of a gasket according to a fourth embodiment of the present disclosure. FIG. 18 is a cross-sectional view of the gasket of FIG. 17.

Sealing devices (sealing devices having a C-ring portion) according to the third embodiment illustrated in FIGS. 15 and 16 are basically the same as the first sealing device 41 according to the first embodiment and thus will be described focusing on the differences from the first sealing device 41. Sealing devices (sealing devices having an O-ring) according to the fourth embodiment illustrated in FIGS. 17 and 18 are basically the same as the third sealing device 51 according to the second embodiment and thus will be described focusing on the differences from the third sealing device 51.

Central layers 10 according to the third and fourth embodiments are formed of insulating materials, unlike the central layers 10 formed of metal materials according to the first and second embodiments. A first layer 21 and a second layer 22 provided on upper and lower surfaces of each of the central layers 10 formed of the insulating materials are formed of metal materials, so that the insulating materials having low heat resistance may be prevented from being exposed to the outside in a high-temperature environment.

In the third and fourth embodiments, a first groove 310 and a second groove 320 into which first and second sealing devices 41 and 42 and third and fourth sealing devices 51 and 52 are inserted are formed in the first layer 21 and the second layer 22 not to pass through the first layer 21 and the second layer 22, unlike in the first and second embodiments. Since the first and second layers 21 and 22 are insulated from each other by the central layer 10 formed therebetween using the insulating material, unlike in the first and second embodiments, a cut portion or a first lower-surface insulating layer as described above in the first and second embodiments are not indispensable and thus manufacturing costs and component costs may be saved.

Figure 19:
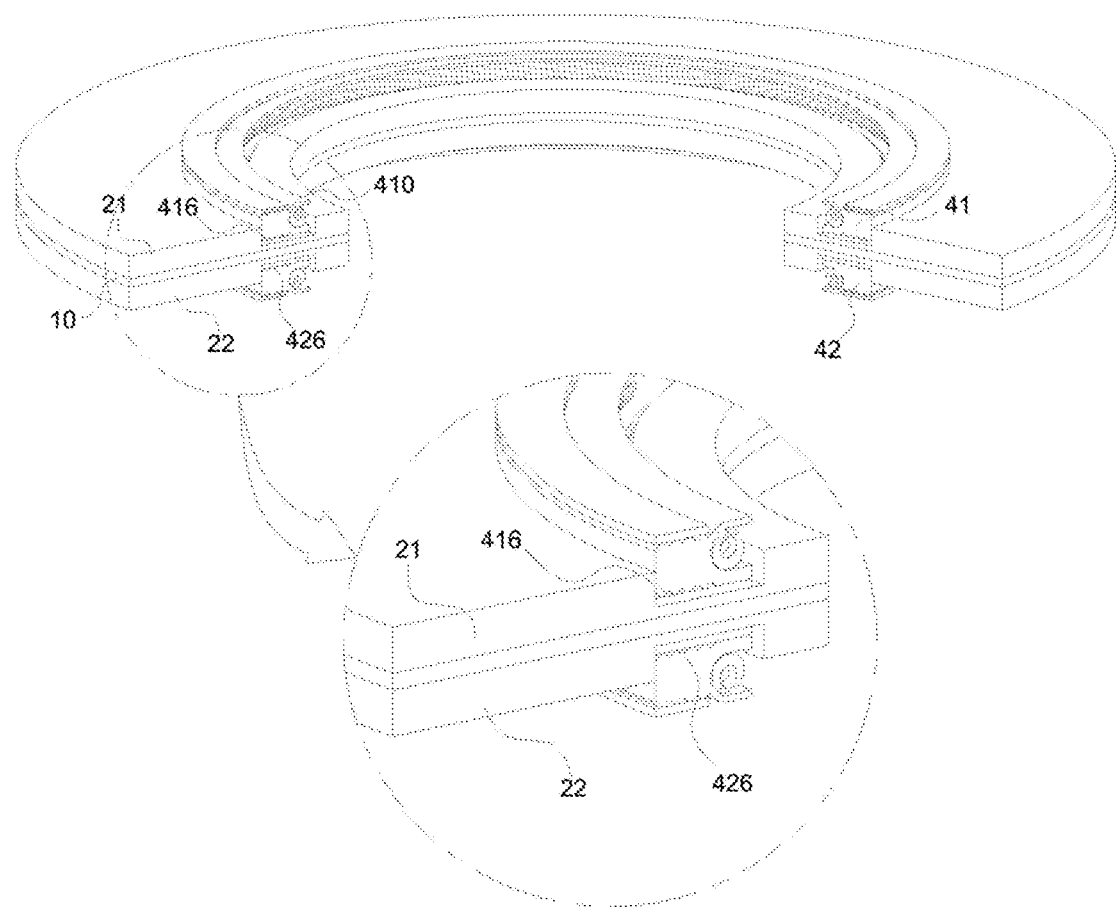
FIGS. 19 and 20 are a perspective view and a cross-sectional view of a modified example of the third embodiment of the present disclosure.
Figure 20:
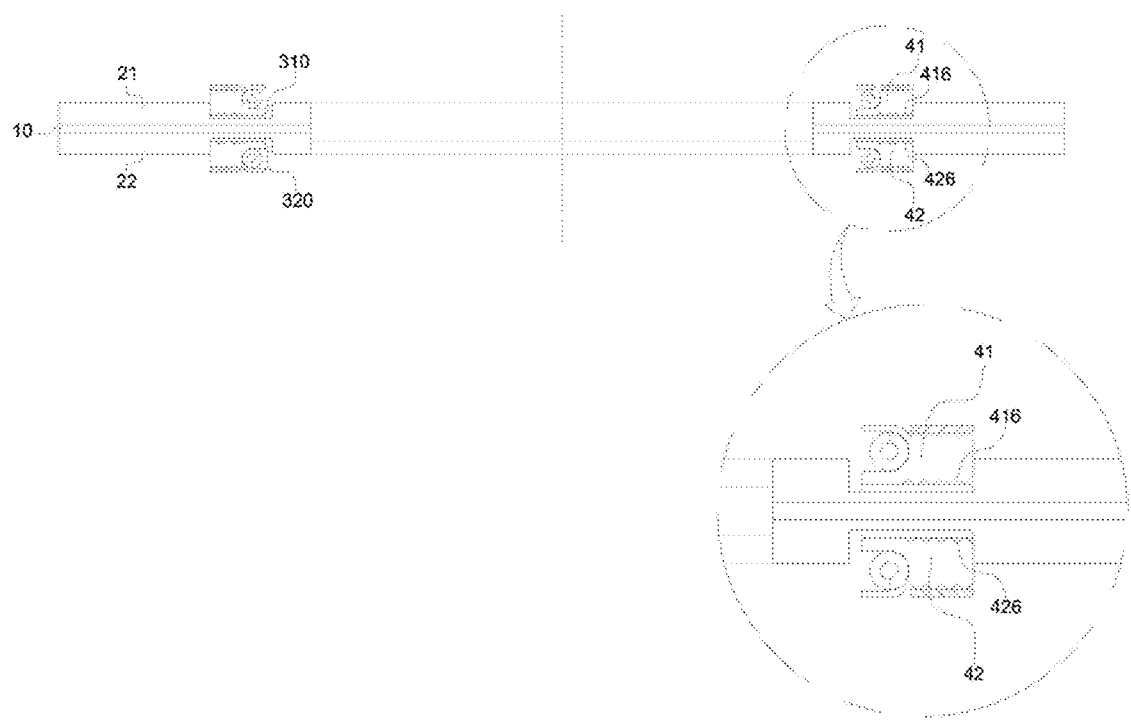

FIGS. 19 and 20 are diagrams illustrating a modified example of the third embodiment of the present disclosure illustrated in FIGS. 15 and 16, in which a first lower-surface insulating layer 419 is formed below a lower surface of a first sealing device 41 and the lower surface of the first sealing device 41 is in a corrugated form 426 of which a lower side is rounded. Unlike in the first embodiment, the first lower-surface insulating layer 419 according to the third embodiment may be formed of a material having high heat resistance, since a general insulating member, when provided on the lower surface of the first sealing device 41, is likely to be melted in a high-temperature environment.

Figure 21:
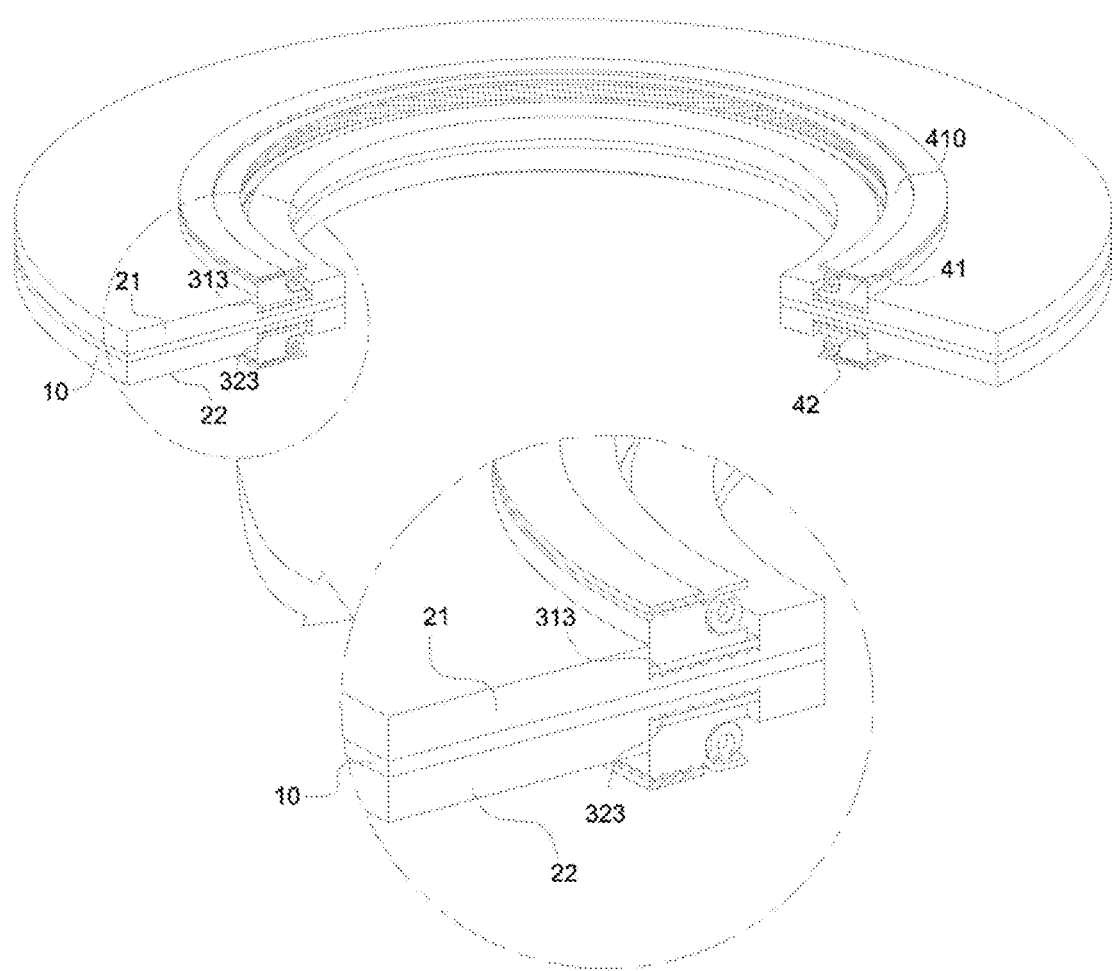
FIGS. 21 and 22 are a perspective view and a cross-sectional view of another modified example of the third embodiment of the present disclosure.
Figure 22:
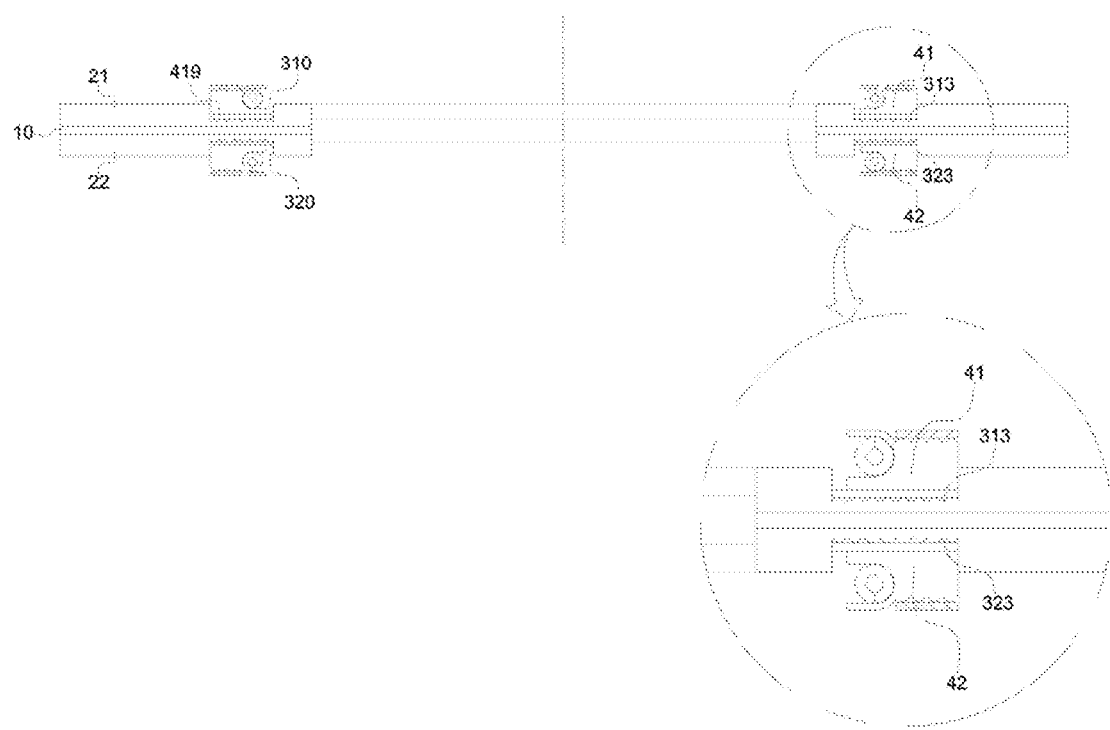

FIGS. 21 and 22 are a diagram and a cross-sectional view of a modified example of the third embodiment of the present disclosure illustrated in FIGS. 15 and 16, in which a lower surface 313 of a first groove 310 is in a corrugated form of which an upper side is rounded for the same purpose as in FIGS. 19 and 20 and thus a first lower-surface insulating layer 419 may be prevented from being damaged and worn out.

A gasket according to a fifth embodiment of the present disclosure will be described with reference to FIGS. 23 and 24 below. Sealing devices 61 and 62 equipped in the gasket according to the fifth embodiment illustrated in FIGS. 23 and 24 will be described with reference to FIG. 25 below.

Figure 23:
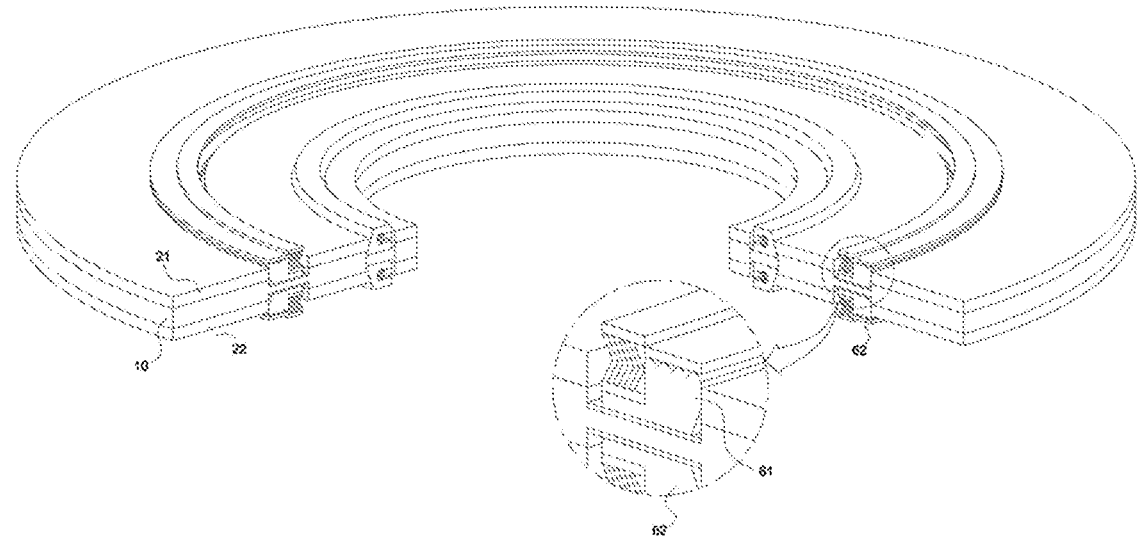
FIGS. 23 and 24 are a perspective view and a cross-sectional view of a gasket with a sealing device including a V-shaped spirally wound sealing portion, according to a fifth embodiment of the present disclosure.
Figure 24:
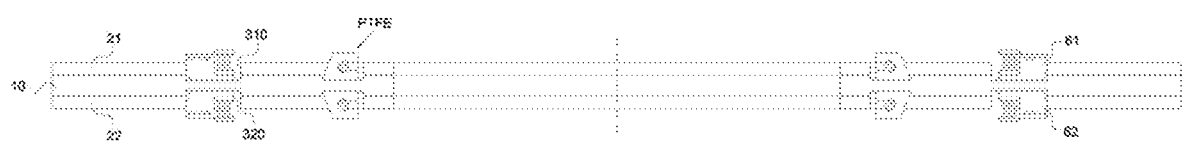

FIG. 23 is a perspective view of the gasket according to the fifth embodiment of the present disclosure. FIG. 24 is a cross-sectional view of the gasket of FIG. 23. Similar to the gasket according to the first embodiment, the gasket according the fifth embodiment of the present disclosure includes a disc type central layer 10 with an open center, and a first layer 21 and a second layer 22 having the same shape as the central layer 10 and formed on upper and lower surfaces of the central layer 10. A first groove 310 and a second groove 320 are respectively formed in the first layer 21 and second layer 22. In the fifth embodiment, the central layer 10 is formed of a metal material, and the first layer 21 and the second layer 22 are formed of electrically insulating materials.

The fifth sealing device 61 and the sixth sealing device 62 are provided in the first groove 310 and the second groove 320 to respectively correspond to the first sealing device 41 and the second sealing device 42 according to the first embodiment, and block a fluid leaking from a flange from flowing in an outer direction to the outside. To avoid redundancy, the fifth sealing device 61 and the sixth sealing device 62 will be described focusing on the differences from the first sealing device 41 to the fourth sealing device 52 below. Since the fifth sealing device 61 and the sixth sealing device 62 have the same shape and are symmetrical to each other in the vertical direction, the fifth embodiment will be described with respect to the fifth sealing device 61 below for convenience of explanation.

Figure 25:
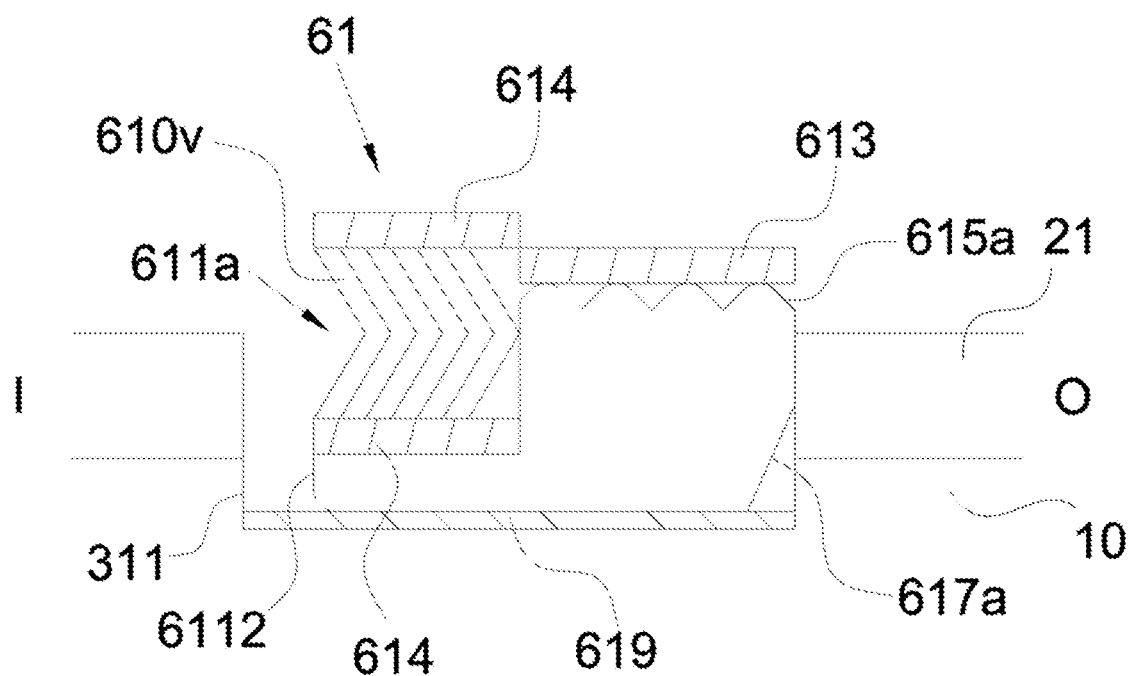
FIG. 25 is an enlarged cross-sectional view of the sealing device of the gasket according to the fifth embodiment illustrated in FIGS. 23 and 24.

A structure and functions of the fifth sealing device 61 will be described in detail with reference to FIG. 25 below. FIG. 25 is an enlarged view of a right part of a cross section of the fifth sealing device 61 illustrated in FIG. 24. In FIG. 25, a direction from a left side of the fifth sealing device 61 is an inner direction I from a central axis, and a direction toward a right side thereof is an outer direction O.

The fifth sealing device 61 illustrated in FIG. 25 may be in the form of a stripe so that it may be inserted into the first groove 310 which is in the form of a stripe, and a height thereof may be greater than that of the first groove 310 (or the second groove 320 to increase a sealing effect.

Figure 26:
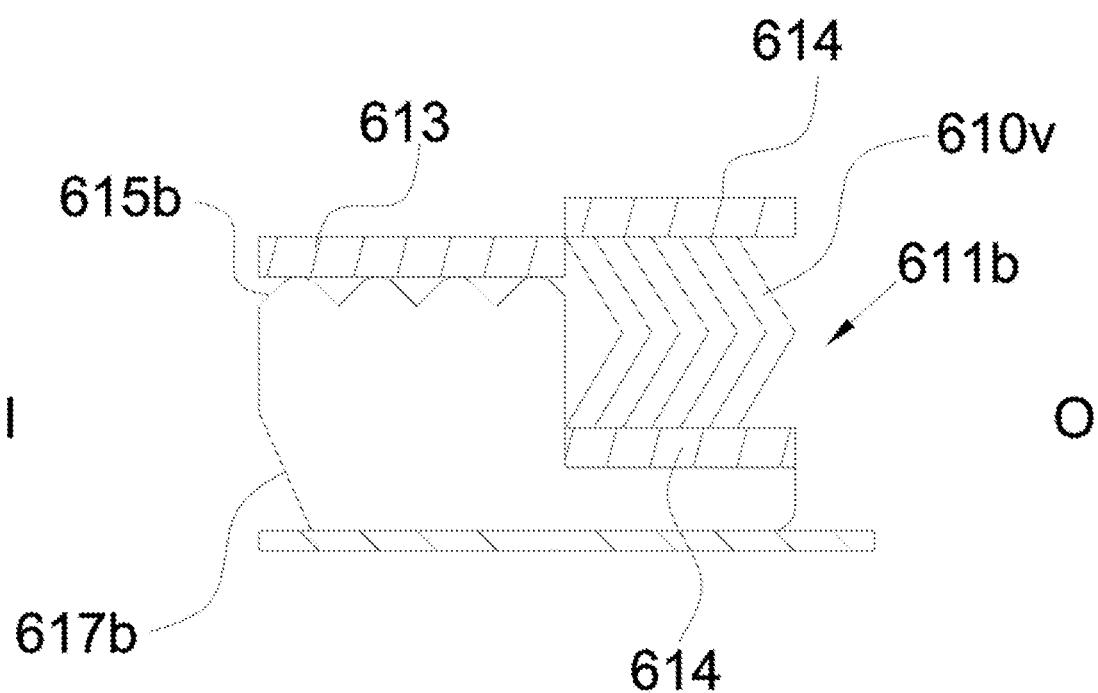
FIGS. 26 and 27 are cross-sectional views of sealing devices according to sixth and seventh embodiments of the present disclosure.
Figure 27:
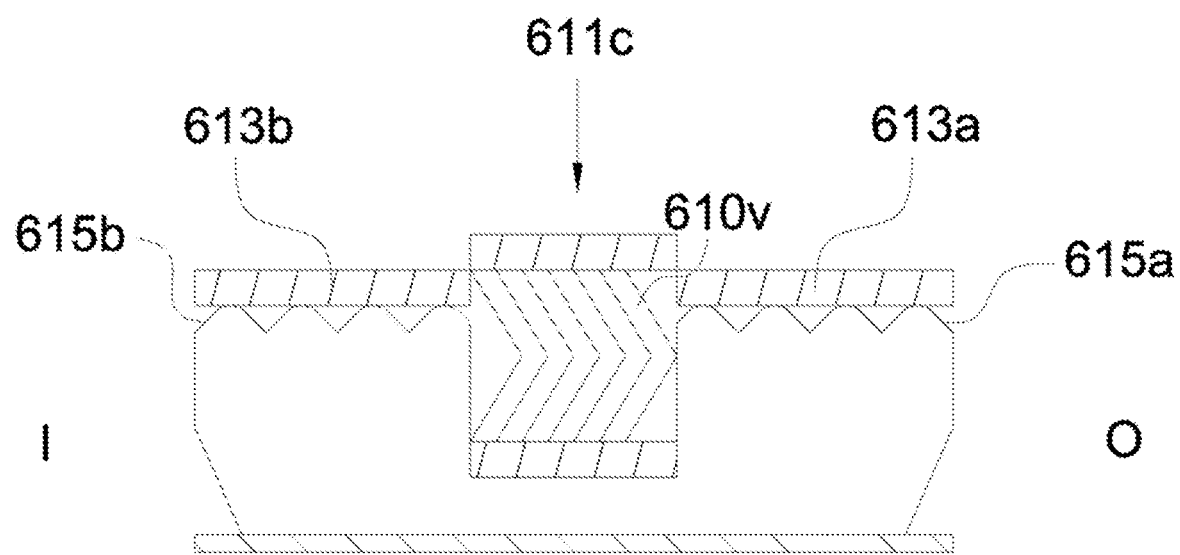

The fifth sealing device 61 includes a holding groove 611a configured to hold a sealing portion 610 which will be described below. As illustrated in FIG. 26 and FIG. 27, the position of the holding groove 611a may vary according to an embodiment. For example, the holding groove 611a may be formed at an inner side of the fifth sealing device 61 to open in the inner direction I (see FIG. 25), a holding groove 611b may be formed at an outer side of the fifth sealing device 61 to open in the outer direction O (see FIG. 26), or a holding groove 611c may be formed at a center of the fifth sealing device 61 (see FIG. 27). The holding groove 611a may be formed by cutting the fifth sealing device 61 formed of a metal material at right angles. In this case, a height of the holding groove 611a may be set to be less than that of the fifth sealing device 61 such that a lower surface thereof on which the sealing portion 610 is held may have a certain size as illustrated in FIG. 25.

The fifth sealing device 61 includes the sealing portion 610 to block a fluid leaking from the inner direction I to the outer direction O. In an exemplary embodiment, the sealing portion 610 may be in a spirally wound form and thus increase the sealing effect at a high temperature and under high pressure. The spirally wound form is obtained by alternately and repeatedly winding a hoof and a filler. The hoof has a V shape 610v consisting of two peaks and one valley. An orientation of the two peaks of the hoof is a direction toward an outer side of the gasket. The filler may include graphite, ceramic, mica, or a combination thereof. That is, the filler may be formed of a non-asbestos material. In an exemplary embodiment, a height of the sealing portion 610 may be greater than that of the holding groove 611a.

In an exemplary embodiment, a second anti-abrasion layer 613 may be further provided on an upper surface 615 of the fifth sealing device 61. As illustrated in an upper right part of FIG. 25, the second anti-abrasion layer 613 may have a rectangular plate type cross section which is in the form of a stripe, and may be provided only an upper surface of a side of the fifth sealing device 61 rather than the entire upper surface 615. The second anti-abrasion layer 613 is configured to additionally block a leaking fluid while decreasing abrasion between the fifth sealing device 61 and a flange in a high-temperature environment. When the second anti-abrasion layer 613 is formed of a graphite material, the second anti-abrasion layer 613 may be sustainable even in high temperatures and electrically insulate between the flange and the fifth sealing device 61.

In a modified example of the embodiment of FIG. 25, the upper surface 615 of the fifth sealing device 61 may be in a corrugated form 615a, the upper end of which is rounded. The corrugated form 615a may not only improve a degree of sealing between the fifth sealing device 61 and the second anti-abrasion layer 613 but also prevent damage to the second anti-abrasion layer 613. The degree of sealing when the corrugated form 615a and the second anti-abrasion layer 613 are in contact with each other is greater than that when the second anti-abrasion layer 613 and the upper surface 615 of the fifth sealing device 61 are in surface contact with each other, and damage to the second anti-abrasion layer 613 may be decreased due to the corrugated form 615a having the rounded upper end.

In an exemplary embodiment, the fifth sealing device 61 may further include a third anti-abrasion layer 614 on upper and lower sides of the sealing portion 610. The third anti-abrasion layer 614 has substantially the same structure as the above-described second anti-abrasion layer 613, and is provided to decrease abrasion between an upper end of the sealing portion 610 and the flange and abrasion between a lower end of the sealing portion 610 and a lower surface of the holding groove 611a of the fifth sealing device 61. Referring to FIG. 25, when the third anti-abrasion layer 614 is provided on the upper and lower sides of the sealing portion 610, a vertical height of the third anti-abrasion layer 614 disposed on the upper side of the sealing portion 610 may be greater than that of the second anti-abrasion layer 613

In the fifth embodiment of the present disclosure illustrated in FIG. 25, a second inwardly cut portion 617a which is cut in the inner direction I may be provided at an outer lower end of the fifth sealing device 61. The inwardly cut portion 617a prevents physical contact between the outer lower end of the fifth sealing device 61 and the central layer 10. In the fifth embodiment, galvanic corrosion may occur when the fifth sealing device 61 and the central layer 10 come into physical contact with each other, since the first groove 310 into which the fifth sealing device 61 is inserted extends to the central layer 10 and the fifth sealing device 61 and the central layer 10 are formed of metal materials. Thus, when the inwardly cut portion 617a is provided, the fifth sealing device 61 and the central layer 10 may be physically insulated from each other. A shape in which the second inwardly cut portion 617a is cut may be a rectangular cross section or may taper from bottom to top, but is not limited thereto and should be understood to include various other cut shapes, provided that the outer lower end of the fifth sealing device 61 and the central layer 10 may be physically insulated from each other.

In the fifth embodiment of the present disclosure illustrated in FIG. 25, in order to physically insulate an inner lower end 6112 of the fifth sealing device 61 and the central layer 10 from each other, an inner sidewall 311 of the first groove 310 and an inner end of the fifth sealing device 61 may be spaced a certain distance from each other. In this case, a horizontal length of a cross section of the fifth sealing device 61 should be less than that of a cross section of the first groove 310. When the inner end of the fifth sealing device 61 is spaced the certain distance from the inner sidewall 311 of the first groove 310 as described above, the inner lower end of the fifth sealing device 61 formed of a metal material may be electrically insulated from the central layer 10 and a degree of sealing between the fifth sealing device 61 and the sealing portion 610 may be increased due to pressure of a leaking fluid.

A second lower-surface insulating layer 619 is provided on a lower surface of the fifth sealing device 61 to electrically insulate between the fifth sealing device 61 and the central layer 10 formed of metal materials. A material of the second lower-surface insulating layer 619 may be an electrically insulating material which is the same as the first lower-surface insulating layer 419.

FIGS. 26 and 27 are cross-sectional views of a gasket according to sixth and seventh embodiments of the present disclosure. To avoid redundancy, the sealing devices according to the sixth and seventh embodiments will be described focusing on the differences from the fifth sealing device 61 according to the fifth embodiment described above with reference to FIG. 25.

FIG. 26 is a diagram illustrating a fifth sealing device according to the sixth embodiment, in which the left and right sides of the fifth sealing device 61 illustrated in FIG. 25 are switched to each other to be symmetrical to each other. The holding groove 611b of FIG. 26 is provided at an outer side of the fifth sealing device and is open in an outer direction O. A basic structure of the fifth sealing device corresponds to that of the fifth sealing device 61 illustrated in FIG. 25, except that a second outwardly cut portion 617b which is cut in the outer direction O is provided at an inner lower end of the fifth sealing device to electrically insulate the fifth sealing device from a central layer (not shown). An inner upper end of the fifth sealing device is in a corrugated form 615b, the upper end of which is rounded as in FIG. 25.

FIG. 27 is a diagram illustrating a fifth sealing device according to the seventh embodiment which is a combination of the fifth sealing devices illustrated in FIGS. 25 and 26. The holding groove 611c illustrated in FIG. 27 is provided at a center of the fifth sealing device and a cross section thereof has a "⊔" shape. A basic structure of the fifth sealing device corresponds to those of the fifth sealing devices of FIGS. 25 and 26, except that a second outwardly cut portion 617b which is cut in an outer direction O and a second inwardly cut portion 617a which is cut in an inner direction I are respectively provided on an outer lower end and an inner lower end of the fifth sealing device to electrically insulate both the inner and outer sides of the fifth sealing device from a central layer (not shown). Since both the outer and inner lower ends of the fifth sealing device are insulated from the central layer as described above, a width of the fifth sealing device according to the seventh embodiment may be equal to that of a first groove 310, unlike in the fifth embodiment of FIG. 25. Furthermore, the fifth sealing device of FIG. 27 may include both a corrugated form 615b and a corrugated form 615a respectively provided at an inner upper end and an outer upper end thereof. As described above, the seventh embodiment of FIG. 27 is a combination of advantageous features of the fifth and sixth embodiments, in which a leaking fluid may be blocked in two stages to maximize the sealing effect.

Figure 28A:
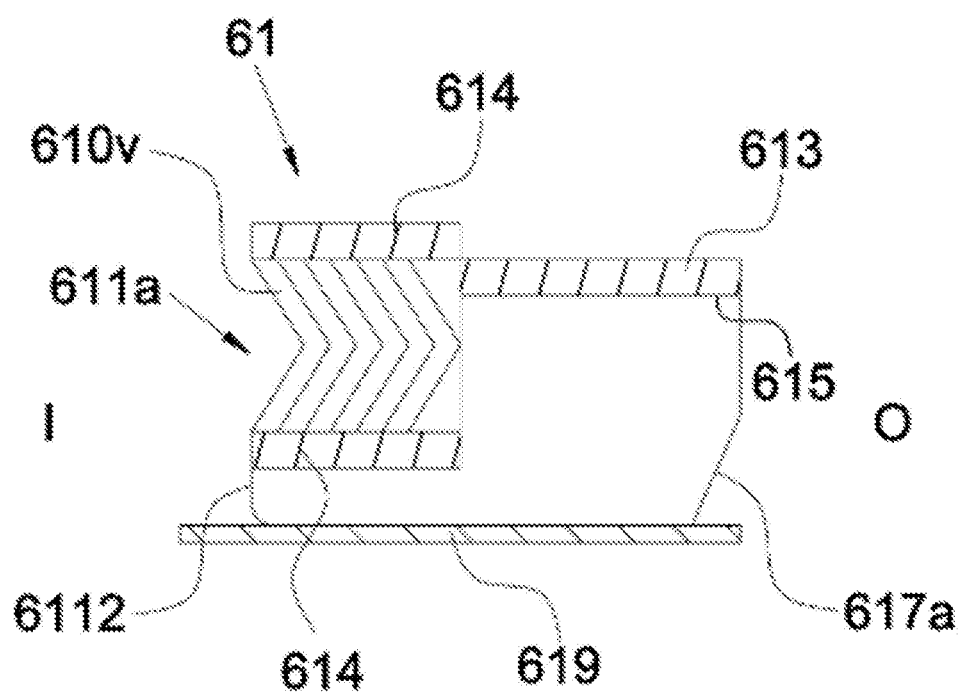
FIGS. 28A to 28C are diagrams illustrating modified examples of the sealing devices according to the fifth to seventh embodiments.
Figure 28B:
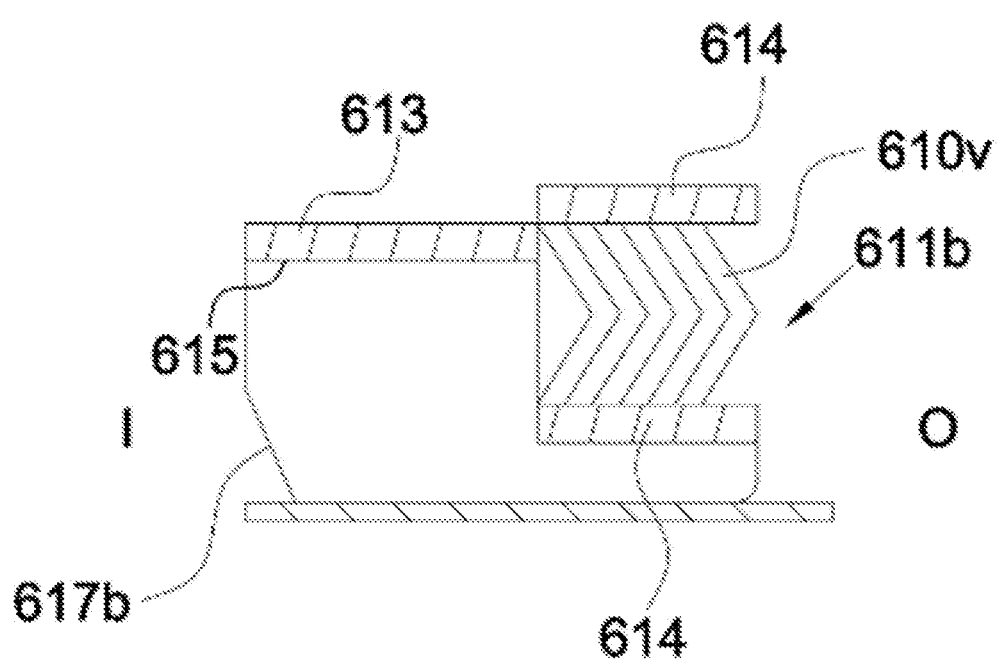
Figure 28C:
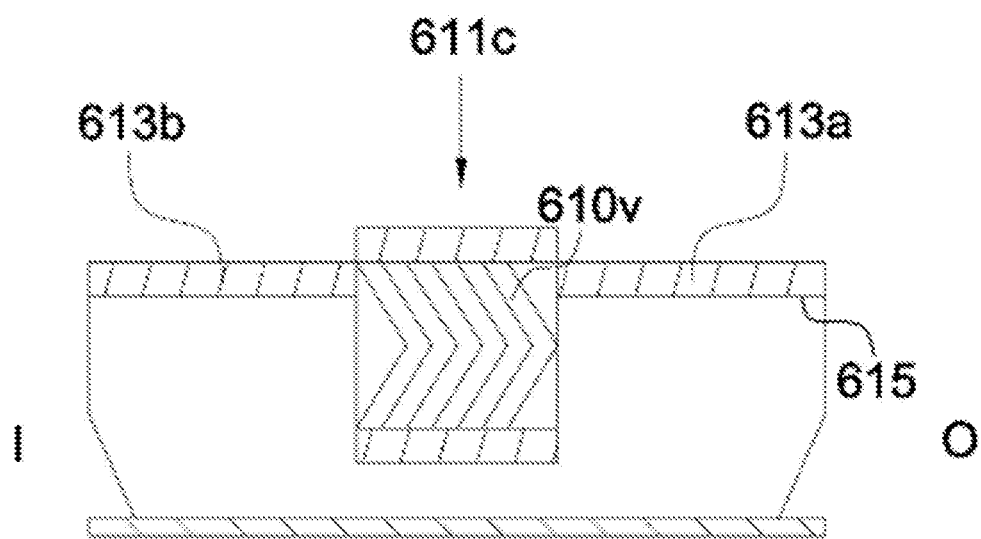

FIGS. 28A to 28C are diagrams respectively illustrating modified examples of the sealing devices according to the fifth to seventh embodiments illustrated in FIGS. 25 to 27, in which each of the sealing devices has a flat form without a corrugated form on an outer upper end and an inner upper end thereof.

Figure 29A:
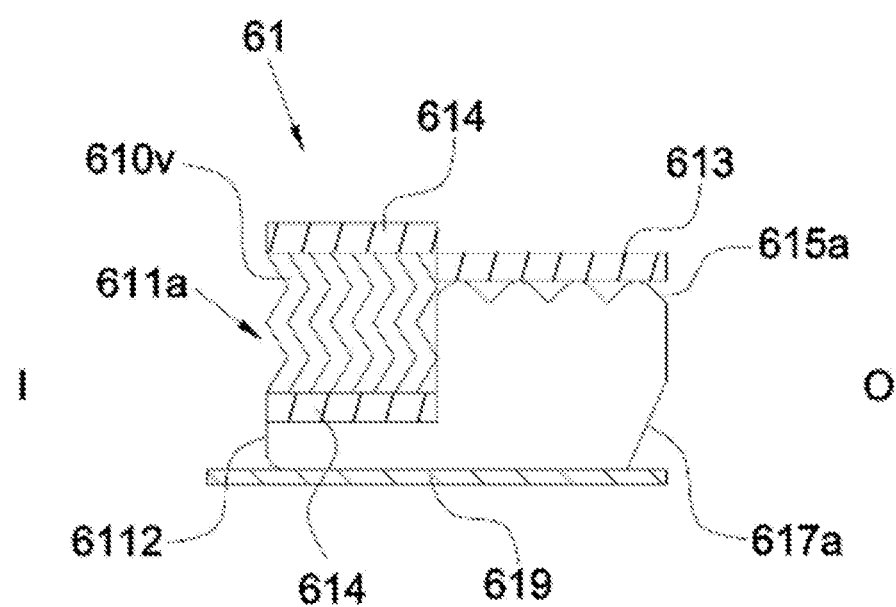
FIGS. 29A to 29C are cross-sectional views of gaskets with the sealing devices including a W-shaped spirally wound sealing portion according to the fifth to seventh embodiments.
Figure 29B:
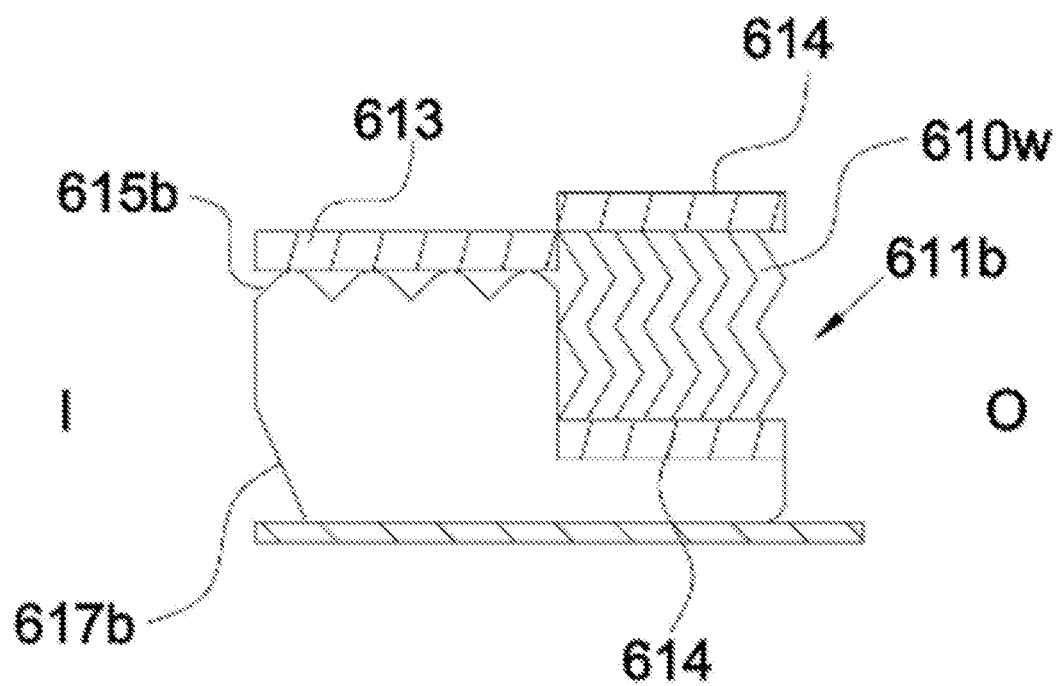
Figure 29C:
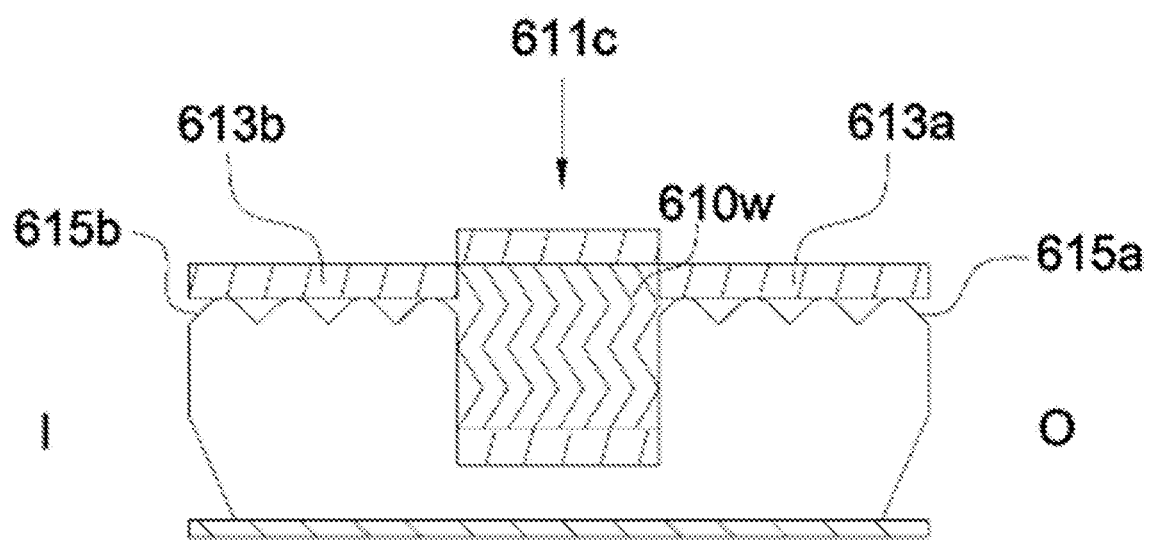

FIGS. 29A to 29C are diagrams respectively illustrating modified examples of the sealing devices according to the fifth to seventh embodiments illustrated in FIGS. 25 to 27, in which each of the sealing devices includes a W-shaped spirally wound sealing portion 610w rather than a V-shaped spirally wound sealing portion.

Modified examples of the gaskets capable of continuously achieving the sealing effect in a high-temperature environment according to the fifth to seventh embodiments will be described with reference to FIGS. 30 to 32 below.

Figure 30:
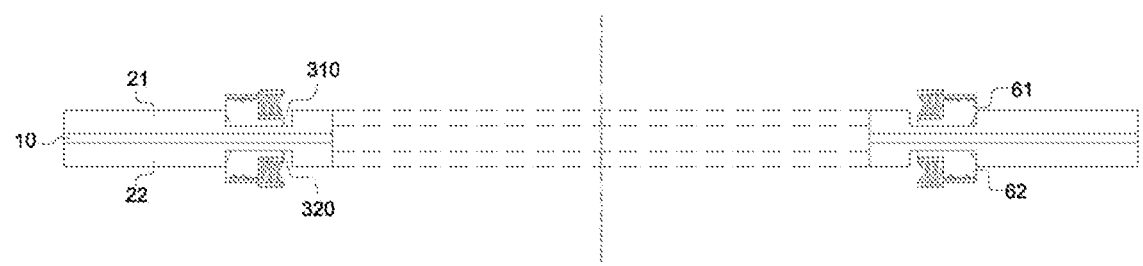
FIGS. 30 to 32 are cross-sectional views of gaskets to which the sealing devices according to the fifth to seventh embodiments are applied.

FIG. 30 is a cross-sectional view of a gasket to which the embodiment of the fifth sealing device of FIG. 25 is basically applied. FIGS. 31 and 32 are cross-sectional views of gaskets to which the embodiments of the sealing devices illustrated in FIGS. 26 and 27 are applied. Shapes and functions of the sealing devices are as described above and thus the sealing devices will be described focusing on the differences from the embodiments of FIGS. 25 to 27 below.

Figure 31:
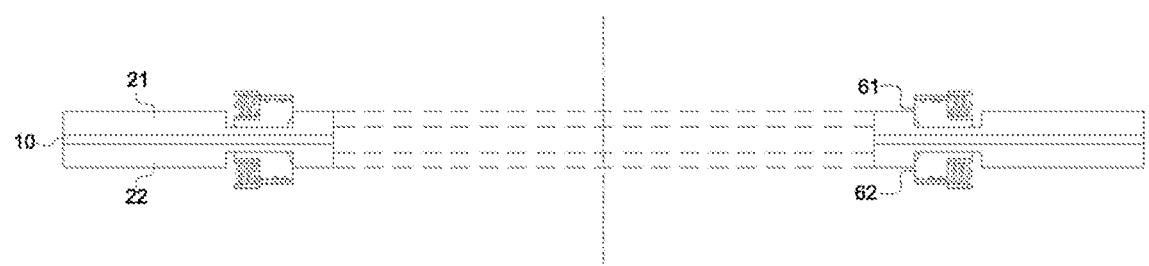
Figure 32:
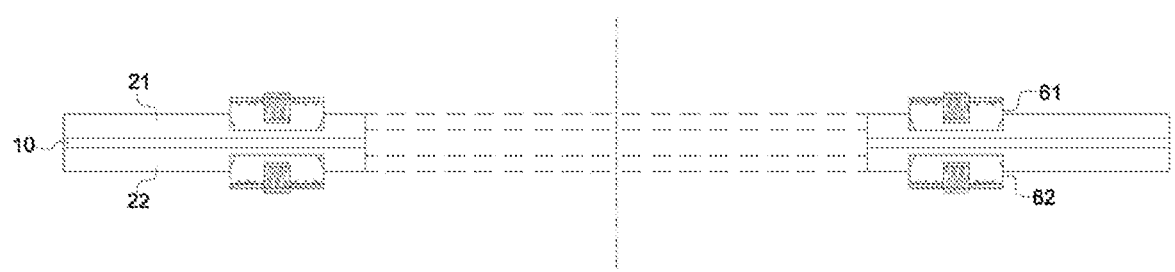

In the embodiments of FIGS. 30 to 32, a central layer 10 is formed of an insulating material, unlike that described above. A first layer 21 and a second layer 22 provided on upper and lower surfaces of the central layer 10 formed of the insulating material are formed of metal materials, so that the insulating material having low heat resistance may not be exposed to the outside in a high-temperature environment.

Furthermore, in the embodiments of FIGS. 30 to 32, a first groove 310 and a second groove 320 into which fifth and sixth sealing devices 61 and 62 are inserted are formed in the first layer 21 and the second layer 22 not to pass through the first layer 21 and the second layer 22, since the first layer 21 and the second layer 22 are insulated by the central layer 10 formed of the insulating material, unlike in the above-described embodiments.

According to the present disclosure, a gasket capable of achieving a higher sealing effect using C-ring or O-ring-shaped sealing devices having a different structure from a sealing device according to the related art can be provided.

According to the present disclosure, the gasket including the sealing devices is electrically insulated and thus the occurrence of galvanic corrosion can be prevented.

Furthermore, according to the present disclosure, the durability of the gasket in a high-temperature environment may be improved, and deterioration of the durability of a product caused by abrasion between the gasket and flanges may be decreased.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:
1. An insulating gasket comprising:
a central layer; and
a first layer and a second layer respectively disposed on an upper surface and a lower surface of the central layer,
wherein the first layer includes a first groove, the second layer includes a second groove, and a sealing device is disposed in each of the first groove and the second groove,
wherein each sealing device is in the form of a ring and comprises a C-ring portion at an inner end thereof, the C-ring portion being open in an inner direction,
wherein the C-ring portion is formed of a resilient material and is capable of being stretched out or contracted,
wherein each sealing device includes an outer lower end having a first inwardly cut portion which is cut in the inner direction, wherein an outer upper surface of each sealing device is in a corrugated form having a rounded upper end, and wherein an inner sidewall of each of the first and second grooves and an inner end of each sealing device are spaced a certain distance from each other in order to be physically insulated from each other.

2. The insulating gasket of claim 1, wherein a lower end of the C-ring portion is fixed, and an upper end thereof is stretchable or contractible.

3. The insulating gasket of claim 1, further comprising a spring portion which is in the form of a ring and is configured to be accommodated in the C-ring portion.

4. The insulating gasket of claim 1, further comprising a first anti-abrasion layer which is in the form of a ring and is disposed on an upper side of the outer upper surface of each sealing device.

5. The insulating gasket of claim 1, wherein the first layer and the second layer are formed of electrically insulating materials, and the central layer is formed of a metal material.

6. The insulating gasket of claim 5, wherein the first groove and the second groove extend to the central layer while respectively passing through the first layer and the second layer.

7. The insulating gasket of claim 6, further comprising a first lower-surface insulating layer disposed between the central layer and each sealing device.

8. The insulating gasket of claim 1, wherein the first layer and the second layer are formed of metal materials, and the central layer is formed of an insulating material.

9. The insulating gasket of claim 8, wherein the first groove extends to the first layer, and the second groove extends to the second layer.

* * * * *